United States Patent Office 3,422,145
Patented Jan. 14, 1969

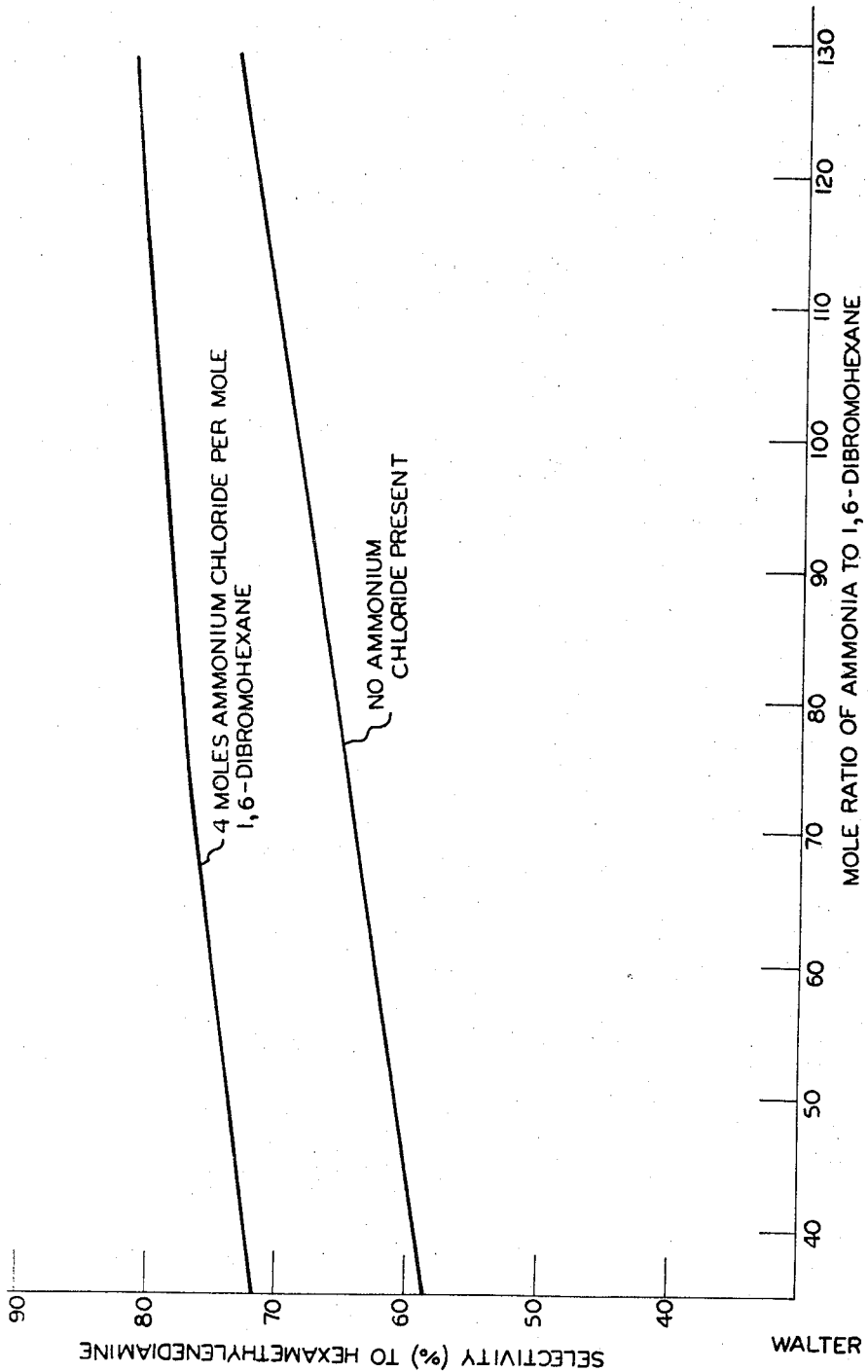

3,422,145
PRODUCTION OF ALPHA, OMEGA-DIAMINES
Walter E. Steinmetz, Shreveport, La., assignor to El Paso Products Company, a corporation of Texas
Filed Sept. 3, 1965, Ser. No. 484,801
U.S. Cl. 260—585    15 Claims
Int. Cl. C07c 85/04

ABSTRACT OF THE DISCLOSURE

Process for the preparation of alpha, omega-alkylenediamines useful as intermediates in the production of nylon which comprises the sequential steps of (1) pyrolyzing an allylic halide in the presence of an olefin at a temperature of about 400° to 750° C. for a time sufficient to effect substantial condensation thereof whereby said allylic halide is converted to its corresponding biallylic derivative; (2) hydrohalogenating the biallylic derivative by catalytic reaction with hydrogen bromide at a temperature of about −80° to 35° C. to obtain the corresponding alpha, omega-dibromoalkane and (3) subjecting said alpha, omega-dibromoalkane to ammonolysis by reaction with a molar excess of ammonia in a ratio of about 10:1 to 180:1 at a temperature of about 16° to 100° C. to obtain the corresponding alpha, omega-alkylene-diamine.

---

This invention relates, in general, to the production of alkylene diamines and in particular, to a new and improved process for the preparation of primary alpha, omega-alkylenediamines according to a multi-step procedure advantageously adapted for implementation on an industrial scale.

As is well known, the nylon industry has assumed a role of vast commercial importance due in large measure to the unique characteristics of polyamide-type resins which render them highly valuable for use in a wide variety of commercial applications. The ever-increasing demand for nylon-type products has correspondingly initiated wide-spread commercial activity, having as its primary object, the provision of more feasible processes for the preparation of nylon intermediates and especially, hexamethylenediamine. The latter material, is, of course, basic to the preparation of innumerable commercial grades of nylon, and, accordingly, a large measure of the industrial research effort has been directed to improved processes as well as more economical means for its synthesis.

However, the processes heretofore customarily employed for the preparation of alkylene polyamines, and particularly hexamethylenediamine, have been uniformly characterized by a number of attendant disadvantages which detract considerably from their desirability for use in a commercial manner for the production of a competitively priced product. As examples of the more significant disadvantages often encountered in connection with the production of alkylene diamines, there may be mentioned, in particular, the relatively low yield of desired diamine product which, in many instances, has been intolerable; the strong tendency for undesirable by-products to form, for example, secondary and tertiary-amino-compounds as well as high molecular weight materials, etc.; the high cost of starting materials, catalysts, process equipments, and the like; the stringent process conditions required to be observed for efficacious implementation; the extended reaction times required; the difficulties associated with product isolation, removal and purification, and the like. As a result, the desired product amine is invariably obtainable in but limited quantities and at relatively high costs.

For example, many of the processes currently employed for the preparation of primary alpha, omega-alkylenediamines, such as hexamethylenediamine, include among others, as an essential manipulative step, the catalytic reduction, i.e., hydrogenation, of an olefin dinitrile to the corresponding diamine. Representative of the foregoing processes are those that involve, seriatim, the formation of a dihaloalkadiene by dimerization of the corresponding terminally unsaturated alkenyl halide, hydrogenation of the dihaloalkadiene to provide the dihaloalkane, and treatment of the dihaloalkane with a cyanide of either an alkali metal or an alkaline earth metal to form the dinitrile intermediate. The latter material is then subjected to catalytic reduction with hydrogen to produce the desired diamine product. Significantly, processes of the foregoing type have been found to be subject to manifold disadvantages, such as those of the type more fully described hereinbefore, including, typically, low product yield and significant by-product formation. Perhaps the paramount disadvantage, however, is one which inheres in the process itself by virtue of the fact that the additional steps of dinitrile formation as well as reduction thereof are necessarily involved. The increased economic burden imposed thereby can, as will be readily apparent, be prohibitive in some instances to the extent that successful maintenance commercial competitive advantage is severely lessened and in some cases lost altogether.

In an effort to overcome or otherwise mitigate the foregoing and related disadvantages, previous investigators have resorted to a variety of remedial techniques, many of which constitute improvements in the above-described process, while others involve substantially different procedures. Regardless of the particular refinements and/or alternative process heretofore proposed, only limited commercial success has been thus far obtained with the result that considerable area for improvement yet remains.

Accordingly, a primary object of the present invention resides in the provision of an improved process for the preparation of alpha, omega-alkylenediamines, wherein the difficulties heretofore encountered are eliminated or otherwise mitigated to at least a substantial degree.

Another object of the present invention resides in the provision of an improved process for the preparation of primary alkylenediamines characterized by exceptional improvement in product yield to an extent heretofore unobtained.

A further object of the present invention resides in the provision of a process for the preparation of hexamethylene diamine which eliminates entirely any necessity for intermediate dinitrile formation, and consequently, the operations necessarily associated therewith.

A still further object of the present invention resides in the provision of a process for the preparation of hexamethylene diamine, wherein the latter is obtained directly from its corresponding dihaloalkane.

Still other and related objects of the present invention will become apparent from the following description thereof.

The attainment of the foregoing and related objects is made possible in accordance with the present invention, which, in its broader aspects includes the provision of a new and improved process for the preparation of alpha, omega-alkylenediamines, which comprises sequentially, (1) the condensation of an allylic halide and an olefin to an alpha, omega-alkadiene; (2) hydrohalogenation of the alkadiene to its corresponding omega, omega′-dihaloalkane; and (3) ammonolysis of the dihaloalkane to yield the corresponding primary alkylenediamine product.

In accordance with the discovery forming the basis of the present invention, it is found that strict adherence to each of the foregoing steps in the chronological sequence specified makes possible the obtention of a diamine product in yields heretofore unobtainable. While there is a tendency for the formation of by-products, in the form of dimers and other higher molecular weight materials the separation of these undesirable materials from the desired diamine by distillation or other means is much easier than with existing conventional processes. Additionally, a significant outstanding advantage of the process of the invention resides in the utilization of mild reaction conditions which do not necessitate high pressure equipment (of the order of 4,000 p.s.i. or higher) resulting in ease of separation of impurities thus reflecting a favorable cost picture as compared to other commercial processes. The commercial implications of this particular feature are of primary importance from an economic standpoint alone, not to mention the added savings attributable to the fact that the product amine is obtained in exceptionally high yield. However, it must be emphasized that the results provided by the present invention depend critically on the observance of each of the above-indicated steps, which will be described in considerable detail in the discussion which follows.

In order to clearly describe the process of the present invention, each of the unit reactions critical thereto will be separately described in the discussion which follows.

CONDENSATION OF AN ALLYLIC HALIDE WITH OLEFINS TO PRODUCT DIOLEFINS

The expression "allylic halide" as used throughout the specification and claims refers to those organic compounds which possess a double bond between two aliphatic carbon atoms, one of which is joined to an aliphatic carbon atom bearing a labile halogen atom. The halogen attached to the aliphatic carbon atom may be any of the halogens such as chlorine and bromine, but, in accordance with the process of the present invention, it is preferable to employ chlorine derivatives. The allylic halides contemplated for use herein may be represented according to the following structural formula:

$$R-CR_1=CR_2-CH_2-X$$

wherein R, $R_1$ and $R_2$ represents hydrogen, alkyl which may be branched or straight-chain, aryl, alkaryl, aralkyl, etc. and X represents halogen, e.g., chlorine, bromine, etc.

The results of the present invention, with respect to ease of operation and high yields of product obtained therewith are particularly manifest with allylic chlorides containing from 3 to 8 carbon atoms, and especially allyl chloride. It will be appreciated, of course, that substituents other than carbon may be present in the allylic compound so long as they are essentially non-reactive and do not otherwise deleteriously affect the reaction involved under the conditions employed in each of the unit reactions, i.e., condensation hydrohalogenation and ammonolysis.

For purposes of illustration, the process of the present invention will be illustrated, specifically, with reference to allyl chloride as the starting olefin halide. However, it will be understood that other allylic halides of the type encompassed by the above formula may be similarly employed.

A number of methods have been provided by which allylic compounds may be converted to their non-conjugated polyunsaturated derivatives including, for example, simple condensation of the allylic halide in the presence of silver or copper, the latter being provided in either supported or powdered form. A further procedure which has met with some success involves dehydrohalogenation of the corresponding halogen substituted derivative. However, the foregoing and related methods have proved unsatisfactory and particularly for large scale operations since the yields obtained are in many instances intolerably low while the reactants employed are often costly.

In accordance with the present invention and pursuant to the maximum attainment of the improvements provided thereby, it is required that conversion of the allylic halide to an alpha, omega-diolefin derivative be effected via a pyrolysis technique. According to this method, the olefin halide, e.g., allyl chloride is heated at a temperature above about 400° C. for a short period of time in the presence of an excess of an organic compound containing a replaceable hydrogen atom, whereupon, the di-olefin-forming reaction proceeds to substantial completion. The desired diolefin derivative may thereafter be readily recovered from the resulting mixture. The replaceable-hydrogen containing compounds suitable for use herein are in general organic compounds having at least one replaceable hydrogen atom and which are stable in the presence of the hydrogen chloride evolved at the elevated reaction temperatures employed. As particular examples of such compounds there may be mentioned without limitation, proylene and isobutylene. In accordance with the present invention, however, it is preferred to employ the 1-alkenes containing from 3 to 5 carbon atoms and especially propylene capable of forming alpha, omega-dienes when reacted with an allylic halide.

The relative proportions of the respective components should be such as to yield a mixture comprising the organic compound containing the replaceable hydrogen atom in excess of the halide, and preferably in a molar excess of at least 3 to 1. Optimum results are achieved, for example, when employing the hydrogen-containing organic compound and unsaturated halide in molar ratios varying from 12:1 to 1:1 and more preferably from 10:1 to 2:1. In general, higher ratios of the organic compound containing the replaceable hydrogen atom give higher yields of product.

The temperature employed for the pyrolysis reaction should in general range from about 400° C. to about 750° C. The particular temperature employed in each case will depend, inter alia, on the nature of the unsaturated halide employed, the residence period, etc. With allyl chloride, preferred temperatures generally range from about 450° C. to about 650° C., and more preferably from about 450° C. to about 600° C.

The pressure employed in the reaction zone may likewise vary over a wide range, i.e., from sub-atmospheric to super-atmospheric inclusive, as desired. However, the improvements provided by the present invention can be readily obtained with the use of pressure approximating atmospheric.

The residence period required for substantial completion of the reaction will depend, for example, on the desired degree of conversion of the unsaturated halide, which, in turn, will depend on the temperature selected as well as the nature of the unsaturated halide. At temperatures ranging, for example, from 400° C. to 750° C., the desired conversion per pass is generally obtained in residence periods ranging from 0.1 second to 50 seconds. For the aliphatic halides, such as allyl chloride, it is found that the desired conversion per pass can be obtained in periods ranging from 0.1–50 seconds at temperatures ranging from 450° C. to 550° C. In general, the utilization of higher temperatures will result in decreased residence times. In this regard, it has been found, for example, that otpimum selectivities can be achieved when employing a 10–1 molar mixture of propylene and allyl chloride at atmospheric pressure through an unpacked tube at approximately 550° C. in a residence time of approximately 12 seconds.

The components may be premixed before they are added to the reaction zone or they may be added separately. If the components are added separately, one or both of the reactants may be added at a plurality of points throughout the reaction zone. To insure a thorough intimate mixing of the components, it is generally desirable, however, to premix the components before introducing them into the reaction zone. It is also advantageous in most instances to preheat the components, either separately or in admixture, to a temperature below the operating temperature before they are added to the reaction zone.

The mixture withdrawn from the reaction zone is cooled, condensed and scrubbed or otherwise treated to remove the hydrogen chloride formed in the reaction zone. The desired unsaturated organic compound or compounds may then be recovered by any suitable means, such as fractional distillation, extraction, and the like. In addition to the desired organic compounds containing the substituted unsaturated radical, the reaction mixture may also contain quantities of the unsaturated halide and the organic compound containing the replaceable hydrogen atom. These by-products may also be conveniently recovered by any of the conventional methods, such as distillation and the like.

The following examples illustrate in tabular form, the results obtained when proceeding according to the above-described method. The procedure employed in as follows: Nitrogen was passed through a flask containing allyl chloride maintained at a desired constant temperature. The nitrogen stream containing entrained allyl chloride vapor was mixed with propylene whose flow rate was measured by a rotameter, and the mixture was passed into a Pyrex tube which was heated in an electric furnace to a desired reaction temperature. The off-gases evolved from the reaction were directed from the Pyrex tube through a series of traps at Dry Ice-acetone temperatures, i.e., on the order of −78° C. Any gases which were not condensed at this temperature, were passed through a wet test meter to obtain their volume. Samples of the off-gas were analyzed chromatagraphically, and the contents of the cold traps were combined and analyzed. The conversion and selectivity are calculated in the following manner:

Percent conversion=

$$\frac{\text{(moles of allyl chloride input)} - \text{(moles of allyl chloride recovered)}}{\text{moles of allyl chloride input}} \times 100$$

Percent selectivity=

$$\frac{\text{moles of 1,5-hexadiene produced}}{\text{(moles of allyl chloride input)} - \text{(moles of allyl chloride recovered)}} \times 100$$

The results obtained are itemized in Table I hereinbelow.

HYDROBROMINATION OF THE DIOLEFIN

Hydrobromination of the alpha, omega- alkadiene to its corresponding alpha, omega-dihaloalkane can be readily and easily achieved according to either of two procedures. One procedure is basically a photochemical process, wherein hydrobromination is effected under the deliberate influence of ultraviolet radiation, and more particularly under the influence of light rays having a wavelength of below about 2,900 to 3,000 angstrom units.

The second procedure by which directional hydrobromination of the diolefins can be accomplished in accordance with the present invention is based on the use of peroxides or hydroperoxides and/or materials which yield peroxides or hydroperoxides under the reaction conditions employed. These materials are introduced into the diolefin in the liquid phase. Regardless of the particular method employed, the hydrobromination reaction proceeds via "abnormal addition," i.e., in a manner contrary to that prescribed by the Markownikoff rule. As is well known, the latter rule holds that, if an unsymmetrical hydrocarbon combined with a halogen acid, the halogen adds to the carbon atom with the least number of hydrogen atoms. A hydrocarbon is unsymmetrical within the meaning of the rule if the unsaturated linkage divides the compound into two dissimilar groups. Accordingly, abnormal addition is descriptive of the condition whereby the hydrogen and halogen atoms are added in positions which are interchanged with respect to the mechanism of addition prescribed by the Markownikoff rule.

Without intending to be bound by any theory, it is postulated that the reaction mechanism involved in the hydrohalogenation reaction, whether initiated in the presence of peroxides or ulraviolet light, is free-radical in nature and can be described according to the following series of reactions:

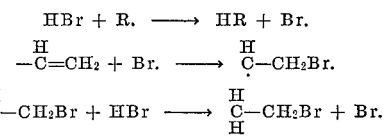

The R. in the first equation respresents a free radical generated as the result of the influence of either a per-

TABLE I

Condensation of Propylene With Allyl Chloride

| Ex. No. | Propylene, Moles/hr. | Chloride, Moles/hr. | Propylene Allyl Chloride | Reactor Packing | Reactor Length | Residence Time, Seconds | Control Temp., ° C. | Conversion, Percent | Selectivity 1,5-hexadiene |
|---|---|---|---|---|---|---|---|---|---|
| 1 | 1.0 | 0.1 | 10 | Alundum | 36 | 9 | 600 | 84.3 | 17.4 |
| 2 | 0.75 | 0.075 | 10 | do | 36 | 12 | 550 | 29.5 | 40.9 |
| 3 | 0.75 | 0.075 | 10 | do | 36 | 13 | 500 | 7.6 | 34.8 |
| 4 | 0.5 | 0.1 | 5 | do | 36 | 16 | 550 | 52.9 | 44.9 |
| 5 | 0.375 | 0.075 | 5 | do | 36 | 21 | 550 | 55.0 | 38.3 |
| 6 | 0.375 | 0.075 | 5 | do | 36 | 22 | 500 | 47.8 | 28.5 |
| 7 | 2.0 | 0.2 | 10 | None | 36 | 9 | 550 | 5.4 | 86.2 |
| 8 | 1.0 | 0.1 | 10 | do | 24 | 12 | 550 | 9.0 | 86.8 |
| 9 | 1.0 | 0.1 | 10 | do | 24 | 12 | 550 | 9.3 | 79.8 |
| 10 | 1.5 | 0.15 | 10 | do | 36 | 12 | 550 | 10.6 | 77.7 |
| 11 | 1.0 | 0.2 | 5 | do | 36 | 16 | 550 | 21.7 | 70.0 |
| 12 | 1.0 | 0.1 | 10 | do | 36 | 18 | 550 | 19.4 | 58.7 |
| 13 | 0.5 | 0.1 | 5 | do | 36 | 32 | 550 | 52.5 | 41.0 |
| 14 | 0.5 | 0.1 | 5 | do | 24 | 20 | 550 | 28.9 | 57.7 |

As will be noted from an inspection of the foregoing data, good results can be obtained with empty i.e., unpacked tubes as well as with tubes packed with Alundum.

As the foregoing results clearly indicate, maximum realization of the results provided by the present invention is achieved when employing propylene and allyl chloride in molar proportions ranging from 12:1 to 1:1 and employing pyrolysis temperatures ranging from 450° C. to 650° C., with a residence time of approximately 0.1 second to 50 seconds.

oxide, hydroperoxide, etc. or by irradiation with ultraviolet light.

As is characteristic of most free radical reactions, the temperature employed may vary within relatively wide limits without deleteriously affecting the reaction rate. In fact, the use of lower temperatures does not appreciably decrease the yield of desired product.

For purposes of providing a clearer understanding, each of the hydrohalogenation reactions utilizable herein, i.e., initiation by ultra-violet light or by the use of peroxides, will be described separately in the discussion which follows.

(A) Ultra-violet light induced hydrobromination

This particular reaction may be readily and easily effected in the vapor or liquid phase or alternatively in a two phase liquid-vapor or liquid phase or alternatively in a two phase liquid-vapor system. Although elevated temperatures may be employed if desired, they would not be required normally, since the abnormal addition of the hydrogen halide according to this method occurs photochemically. Accordingly, heating would not be necessary in the sense of being critical to the results provided herein. In general, temperatures on the order of 25° C. may be employed, although it is preferable, as indicated hereinabove, to employ reduced temperatures ranging down to —80° C. being found to be particularly advantageous. Although the hydrohalogenation reaction may be effectively accomplished by the use of the entire range of ultra-violet radiation, it is found that the most effective wave-length, in the sense of promoting the aforedescribed abnormal type hydrobromination, lies in that portion of the spectrum which is below about 3200 Angstrom units, and more particularly, in the neighborhood of 2900 Angstrom units. This may be readily accomplished by the appropriate selection of a suitable radiation source and/or by the interposition of a suitable filter agency. Suitable filter materials comprise for example quartz crystals since the latter exhibit substantial transmittance to spectral radiation below 3000 Angstrom units. However, the use of either ordinary window glass or Pyrex glass as the filter agency would not be permitted since each of these materials possess a lower transmission limit of about 2900 to 3000 Angstrom units and accordingly, would intercept that portion of the spectrum which would be effective for the hydrobromination reaction contemplated herein.

The ultra-violet light induced hydrobromination is usually characterized by an initial induction period during which time substantially no reaction occurs. The length of this induction period varies depending, inter alia, on a number of conditions such as the specific reactants employed, their concentration in the reaction zone, intensity of the effective wave-length, presence or absence of impurities and/or added surfaces in the reaction zone, etc. Moreover, other conditions being equal, a change in the intensity of the effective wave-length of the ultra-violet radiation will vary the rate and degree of abnormal hydrobromination, and may, in some instances, result in the formation of a mixture of reaction products. This is due to the fact that both normal and abnormal addition of the hydrogen bromide to the unsaturated organic compound may occur.

The hydrobromination reaction may be effectively carried out in a batch, intermittent or continuous manner. When utilizing a batch-method, the involved ingredients may be conveyed into a suitable container and thereafter subjected to the influence of ultra-violet light for a period of time sufficient to effect the hydrobromination reaction. As will be readily apparent, since ordinary glass or Pyrex glass will not permit the substantial transmission of the effective light waves, namely, those in the neighborhood of 2900 to 3000 Angstrom units and below, it is prefer-able to construct the reaction vessel of quartz or some other equivalent material which exhibits substantial transmission to the desired wave lengths. It will be further understood, of course, that most any materials of construction may be employed in fabricating the reaction vessel, provided it be equipped with a suitable aperture through which the effective ultra-violet radiation may be readily directed.

In order to evaluate the efficiency of hydrobromination reactions based on the use of ultra-violet radiation as the initiating agency, a series of reactions is carried out in the following manner.

A stream of nitrogen was passed through a flash containing 1,5-hexadiene maintained at a suitable temperature. The nitrogen stream, containing entrained 1,5-hexadiene vapor, was then mixed with hydrogen bromide, in the proportions stated hereinbelow, in a Vycor tube, whereupon the entire mixture was subjected to ultra-violet radiation. The off-gases evolved from the reaction mass were then passed through various traps in order to condense the products formed. The results obtained are summarized in Table II below:

TABLE II
Reaction of 1,5-Hexadiene and Hydrogen Bromide In the Presence of Ultra-Violet Light

| Ex. No. | Moles 1,5-hexadiene | Moles HBr/ 1,5-hexadiene | Residence Time (Minutes) | Light Source | Distance Light to Reactor (in.) | Conversion, Percent | Selectivity 1,6-dibromohexane | Selectivity 6-bromohexene |
|---|---|---|---|---|---|---|---|---|
| 15 | 0.021 | 1.7 | 3.1 | Hanovia[1] | 6 | 52.9 | 10.8 | |
| 16 | [2] 0.039 | 1.9 | 3.1 | ___do___ | 7.5 | 66.6 | 41.2 | |
| 17 | [3] 0.022 | 1.7 | 3.1 | ___do___ | 7.5 | 79.4 | 29.3 | |
| 18 | 0.024 | 1.5 | 3.1 | Fluorescent U-V-Tube | 2.5 | 39.0 | 0 | 10.3 |
| 19 | 0.022 | 2.0 | 11.2 | Hanovia | 6 | 35.3 | 42.2 | 45.1 |

[1] Hanovia 200 w. Lamp Type 654A.
[2] Containing 0.5 wt. percent acetone.
[3] Containing 1.1 wt. percent acetone.

The percent conversion and percent selectivity are obtained according to the following equations:

Percent conversion =

$$\frac{\text{(moles 1,5-hexadiene input)} - \text{(moles 1,5-hexadiene recovered)}}{\text{moles 1,5-hexadiene input}} \times 100$$

Percent selectivity =

$$\frac{\text{moles of 1,6-dibromohexane produced}}{\text{(moles 1,5-hexadiene input)} - \text{(moles 1,5-hexadiene recovered)}} \times 100$$

(B) Free radical induced hydrobromination

The free radical induced hydrobromination reaction contemplated for utilization in the method of the present invention may be effectively carried out in the presence of a variety of compounds known to liberate free radicals, such as triphenylmethyl and azo-bis-isobutyronitrile. Accordingly, any of the well-known free-radical initiators may be employed in this regard. However, the results provided by the present invention are particularly manifest when employing oxygen in uncombined form, i.e., air or oxygen since each of the foregoing materials exhibits a ready tendency to form peroxides or hydroperoxides under the conditions employed in the hydrohalogenation reaction. However, the results provided by the present invention can also be obtained, by the use of materials wherein the oxygen is present in combined form. As examples of the latter materials there may be mentioned in particular and without limitation, the organic peroxides, e.g., the dialkyl peroxides, such as diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc. Inorganic peroxides may also be employed to advantage, such as for example hydrogen peroxide, barium peroxide, magnesium peroxide, etc. The peroxide compounds may also be employed in the form of salts of inorganic per-acids, such as for example, ammonium persulfate, sodium persulfate, potassium persulfate, sodium percarbonate, potassium percarbonate, sodium perborate, potassium perborate, sodium perphosphate, potassium perphosphate.

Optimum realization of the results provided by the present invention are further promoted, however, by the use of hydroperoxides generated in situ by passing air through the diolefin material being subjected to hydrohalogenation.

Moreover, when utilizing uncombined oxygen as the free-radical progenitor, it has been found that the uncombined oxygen compound can be dissolved in and/or reacted with the diolefin material e.g., 1,5-hexadiene prior to the introduction of the hydrogen bromide. This can best be accomplished by premixing the uncombined oxygen with the diolefin material at temperatures slightly in excess of room temperature. It has also been found that excellent results can also be obtained by introducing a mixture of air or oxygen and hydrogen bromide to the 1,5-hexadiene. This can perhaps be explained by the fact that dry hydrogen bromide in the absence of peroxides or hydroperoxides does not react rapidly at room temperature, but in the presence of peroxides or hydroperoxides, the reaction is accelerated considerably. Consequently, when these two materials are mixed and bubbled through the 1,5-hexadiene, little reaction occurs before some hydroperoxides have been formed from the air or oxygen. At this time, the hydrogen bromide begins to react with the 1,5-hexadiene to form the desired products.

In order to evaluate the effectiveness of peroxide-induced hydrohalogenations, a series of runs was carried out in the following manner.

The free radical generating compound was dissolved in the 1,5-hexadiene in the liquid phase or an oxygen-containing gas was bubbled therethrough. whereupon the resultant mixture was contacted with gaseous hydrogen bromide employing the temperatures indicated in Table III:

medium. The oxygenated or aerated 1,5-hexadiene is then contacted with hydrogen bromide at the temperatures indicated. The percent conversion and percent selectivity are derived according to the equations given below:

Percent conversion=
$$\frac{(\text{moles 1,5-hexadiene input}) - (\text{moles 1,5-hexadiene recovered})}{\text{moles 1,5-hexadiene input}} \times 100$$

Percent selectivity=
$$\frac{\text{moles of 1,6-dibromohexane produced}}{(\text{moles 1,5-hexadiene input}) - (\text{moles 1,5-hexadiene recovered})} \times 100$$

As will be further noted, improved conversion and selectivity values are particularly manifest when the 1,5-hexadiene and uncombined oxygen e.g., oxygen, air, ozone are premixed at moderate temperatures on the order of 26° C. prior to introducing the hydrogen bromide. As indicated in Example 25, selectivities of 1,6-dibromohexane in excess of 90% for conversions on the order of 100% can be expected when premixing the oxygen liberator and 1,5-hexadiene at a 26° C. and effecting hydrohalogenation at $-78°$ C. In fact, regardless of the particular peroxide liberating material employed, superior results are obtained according to the premixing procedure. Moreover, with peroxide initiators, it is preferable to employ hydrohalogenation temperatures ranging from 35° C. down to about $-80°$ C. with temperatures in the range of 26° C. to $-78°$ C. being particularly preferred for realizing optimum results when operating at atmospheric pressure. The pressure employed for the reaction is not particularly critical although in some cases, it will impose a limitation on the temperatures selected. In this regard, and as indicated in Example 33, temperatures in excess of room temperatures are to be avoided when operating under atmospheric pressure. As will be noted, the use of elevated temperatures under these pressure conditions gave rise to markedly poor hydrogen bromide absorption so that this run was terminated before all the hydrogen bromide was added with the consequence that inferior conversion and selectivity values were obtained. Other factors found to deleteriously influence the hydrobromination reaction when employing peroxide-type initiators relate to the type of reaction vessel employed. As indicated in Example 31, stainless steel reaction vessels are found to materially retard the hydrohalogenation reaction rate to the extent that no product 1,6-dibromohexane is obtained despite a conversion of

TABLE III

Reaction of 1,5-hexadiene and HBr In the Presence of Peroxides At Atmospheric Pressure

| Ex. No. | Moles 1,5-H | Moles HBr/Mole 1,5-H | React Temp., °C. | Special Reaction Conditions | Mole Percent Conv. | Mole Percent Sel. 1,6-DBH | Sel. 6-BH |
|---|---|---|---|---|---|---|---|
| 20 | 0.025 | 2.0 | $-78$ | 0.6 g. Benzoyl Peroxide Added | 93.7 | 73.0 | 1.3 |
| 21 | 0.025 | 2.2 | $-78$ | No added Peroxides | 95.1 | 1.5 | 6.9 |
| 22 | 0.025 | 2.2 | $-78$ | 0.03 g. Benzoyl Peroxide Added | 97.1 | 10.1 | 11.6 |
| 23 | 0.025 | 2.3 | $-78$ | 0.06 g. Benzoyl Peroxide Added | 99.0 | 84.3 | 0 |
| 24 | 0.025 | 2.3 | $-78$ | 60 cc. $O_2$/cc. 1,5-H at $-78°$ C | 93.2 | 0.5 | 1.3 |
| 25 | 0.025 | 2.3 | $-78$ | 40 cc. $O_2$/cc. 1,5-H at 26° C | 100 | 93.0 | 0 |
| 26 | 0.025 | 3.1 | $-16$ | 0.06 g. Benzoyl Peroxide Added | 98.5 | 82.5 | 2.7 |
| 27 | 0.025 | 2.3 | $-12$ | 0.068 g. $H_2O_2$ (30%) Added | 100 | 81.6 | 0 |
| 28 | 0.025 | 2.3 | $-16$ | 40 cc. $O_2$/cc 1,5-H at 26° C | 99.0 | 67.2 | 14.3 |
| 29 | 0.025 | 2.3 | 26 | 40 cc. $O_2$/cc. 1,5-H at 26° C | 96.1 | 52.1 | 39.6 |
| 30 | 0.025 | 2.3 | 26 | 123 cc. Air/cc. 1,5-H at 26° C | 99.0 | 80.2 | 6.9 |
| 31 | 0.025 | 2.7 | 26 | 273 cc. Air/cc. 1,5-H at 26° C. React. in S. S. Bomb | 86.9 | 0 | 0 |
| 32 | 0.025 | 2.3 | 26 | 273 cc. Air/cc. 1,5-H at 26° C. React. run with S. S. rings present | 23.8 | 0.7 | 30.9 |
| 33 | 0.05 | 1.7 | 45 | 167 cc. Air/cc. 1,5-H at 26° C. Poor HBr Absorption | 16.3 | 7.5 | 0 |
| 34 | 0.025 | 2.3 | 26 | 100 cc. Air/cc. 1,5-H at 26° C | 99.0 | 80.8 | 13.7 |
| 35 | 0.025 | 2.3 | 26 | 17 cc. Air/cc. 1,5-H at 26° C | 99.5 | 88.4 | 3.1 |
| 36 | 0.025 | 1.5 | 26 | 17 cc. Air/cc. 1,5-H at 26° C | 90.8 | 46.3 | 46.2 |
| 37 | 0.025 | 2.3 | 26 | 7 cc. Air/cc. 1,5-H at 26° C | 99.0 | 61.3 | 27.8 |

NOTE: 1,5-H is 1,5-hexadiene; 1,6-DBH is 1,6-dibromohexane; 6-BH is 6-bromohexene-1; SS is 316 Stainless Steel.

As will be noted from Example 21, some amount of peroxide must be present for the reaction to occur; in other examples, e.g. 25, 28, 30, etc., the peroxides or hydroperoxides are formed in the 1,5-hexadiene by bubbling various volumes of oxygen or air through the diolefin 1,5-hexadiene of about 87%. Accordingly, the use of these and related materials is to be avoided.

The amount of free radical initiator employed is not particularly critical, aside from the obvious requirement that it be sufficient to permit the desired hydrohalogenation reaction rate. This may be readily accomplished by the use of exceedingly small amounts and especially when operating under the preferred conditions since the reaction, once initiated, is substantially self-sustaining, in view of the fact that free radical regeneration is inherent in the reaction mechanism involved. In general, however, the amount of oxygen initiator employed, whether in combined form, i.e., organic peroxides, inorganic peroxides, hydroperoxides, etc., or uncombined form, i.e., air, ozone, molecular oxygen, etc., should be such as to yield a peroxide or hydroperoxide concentration in the reaction mixture of about 3.0 mole percent. When employing oxygen or an oxygen-containing gas as the free radical initiator in uncombined form, it may be introduced into the diolefin-containing medium by any suitable method which is conducive to efficient gas-liquid contacting. For example, although not the most efficient method, it is found that the gaseous, oxygen-containing material can be readily introduced into the diolefin by merely bubbling same thereinto. In the above examples, this was accomplished by the use of a capillary tube. Of course, the reaction mixture may be maintained under suitable agitation to further promote efficient phase intermixing.

The proportions of hydrogen halide, e.g., hydrogen bromide, employed in the hydrohalogenation reaction, whether initiated by ultra-violet or peroxide, although not particularly critical, should nevertheless be maintained within certain limits in order to assure the realization of advantageous results. In general, the proportions of hydrogen halide will range from 1.3 parts to 4.0 parts by moles based on the diolefin treated therewith. It is particularly preferred, however, to utilize hydrogen bromide as the hydrohalogenating agent and in excess amounts corresponding to a range of 1.5 parts to 3.5 parts by moles of the diolefin. For example, in this connection, it will be noted by reference to Examples 25 and 35 that selectivities of 1,6-dibromohexane in excess of 80% are obtained when employing hydrogen bromide/1,5-hexadiene mole ratios on the order of 2.3:1 under atmospheric pressure. When the diolefin and uncombined oxygen are premixed under highly reduced temperatures, e.g., on the order of −78° C. prior to treatment with the hydrogen bromide, the yield of product obtained is negligible as will be evident from Example 24. Regardless of the premixing temperatures employed, the use of elevated temperatures on the order of 40° C. to 45° C. at atmospheric pressure for the HBr treatment likewise results in the obtention of negligible product yields as indicated in Example 33.

Accordingly, optimum realization of the results provided by the present invention are obtained when utilizing (a) uncombined oxygen as the peroxide or hydroperoxide progenitor, (b) hydrogen bromide as the hydrohalogenating agent, (c) premixing of the uncombined oxygen and diolefin material at moderate temperatures e.g., 18° C. to 35° C. and (d) molar excesses of the hydrogen bromide.

DIAMINE PRODUCTION BY AMMONOLYSIS OF THE HYDROBROMINATED DIOLEFIN

The diamine-forming step contemplated for utilization in the process of the present invention involves the treatment of the hydrohalogenated diolefin with ammonia under closely controlled conditions to be described hereinafter and optionally in the presence of one or more additional ingredients which function as promoters in the overall reaction. It is known that alkyl halides can be converted directly to their corresponding amine derivatives by treatment with ammonia. However, the methods heretofore provided in this connection require the use of elevated temperatures in excess of 100° C. and preferably on the order of 200° C. and higher. These elevated temperature conditions have been found to provide commercially feasible reaction rates, product yield, etc. However, the product obtained according to such methods is invariably a mixture of various mono- and polyamines as well as high molecular weight materials and consequently must be subjected to further treatment, e.g., fractional distillation, extraction and the like in order to separate and eventually isolate the particular amine product desired. Moreover, the alkyl halides commonly employed in such methods and especially under the elevated temperatures required therein give rise to serious problems associated with undesired by-product formation.

In contra-distinction, the amine-forming reaction contemplated for use herein is carried out under relatively mild temperature conditions utilizing specified amounts of ammonia and if desired, in the presence of specified amounts of an acidic materials in the ammonia system such as ammonium halides, which serve to eliminate or otherwise retard undesired by-product formation.

It is particularly preferred, in accordance with the present invention, to employ the dihaloalkane in the form of its bromide derivative e.g., 1,6-dibromohexane, this particular derivative being found to react quite readily under the conditions employed while leading to greater product yields, decreased by-product formation, etc.

One of the truly advantageous features of the present invention resides in the discovery that the ammonolysis reaction may be carried out in highly efficient manner with the use of anhydrous ammonia, the latter being preferably maintained in the liquid phase. This result is somewhat surprising since ordinarily it would be expected that the ammonia and diolefin would react to form high molecular weight materials of the resinous and/or sub-resinous varieties at the higher ammonia concentrations taught by the art. However, when operating under conditions to be more particularly specified in the following discussion, it is found that any tendency for products other than the desired diamine derivative to form is substantially eliminated. The use of anhydrous ammonia likewise permits the more efficient utilization of the involved ingredients.

The ammonolysis reaction may also be carried out utilizing the ammonia in the form of an aqueous solution, i.e., ammonium hydroxide. Regardless of whether the ammonia is employed in anhydrous form or as an aqueous solution, it should be present in amounts sufficient to yield an ammonia/dihaloalkane mole ratio of at least 10:1 to at least about 180:1 and preferably within the range of from about 60:1 to about 140:1 and higher.

It will also be understood that any 6-bromohexene-1 which is formed during the hydrohalogenation can be readily recovered and recycled for conversion to 1,6-dibromohexane.

In many instances, the dibromoalkane employed for ammonolysis will exhibit a strong tendency to react with the diamine derivative produced therefrom. For example, 1,6-dibromohexane exhibits a strong tendency to react with hexamethylenediamine to form undesired by-products such as polyamine hydrobromides. Spurious side reactions, moreover, are accelerated with increased temperatures and especially within the temperature ranges characteristic of ammonolysis methods heretofore provided. In contra-distinction the ammonolysis reaction utilized herein can be effectively carried out over a relatively mild range of temperatures and to that extent tends to decrease by-product formation. By-product formation is further minimized by employing the ammonia in the amounts specified above since the net effect is to decrease, substantially, contacting of the 1,6-dibromohexane starting material with the hexamethylenediamine product. The importance of this particular feature cannot be emphasized too strongly since the yield of product depends critically thereupon. In addition, the product yield of e.g., hexamethylenediamine can be further promoted by including in the ammonia system a strong acid, such as ammonium chloride, ammonium bromide and the like, which reacts with the strongly alkaline hexamethylene diamine as it is formed to convert it to its dihydrohalide derivative. As will be readily apparent, this likewise tends to minimize the simultaneous presence of the 1,6-dibromohexane and hexamethylenediamine product thereby diminishing byproduct formation. The reaction involved can be described by the following equation:

$$H_2N(CH_2)_6NH_2 + 2NH_4Cl \rightarrow [H_2N(CH_2)_6NH_2] \cdot 2HCl + 2NH_3$$

The hexamethylene diamine dihydrochloride produced, exhibits little tendency to react with the 1,6-dibromohexane.

The amount of ammonium halide employed in the ammonolysis reaction should be in excess of the dibromoalkane and preferably, such as to yield an ammonium halide/dibromoalkane molar ratio within the range of from 0 to about 20 moles per mole of dihaloalkane. It will be understood, of course, that other halogen-containing, saltforming compounds in addition to the aforestated ammonium halides may be similarly employed so long as they tend to react with the alkylene diamine product to form a derivative which is immune to attack by the dibromoalkane starting material. Regardless of the particular compound employed in this connection, it should be devoid of substituents other than halogen which might react with ammonia under the conditions employed.

The temperature employed for the ammonolysis reaction should not exceed approximately 50° C. to 150° C. and preferably falls within a range of from about 16° C. to about 100° C. For example, the ammonolysis reaction readily proceeds in the desired manner when utilizing temperatures ranging from 20 to 25° C. However, since the reaction involved is exothermic, in those cases where the ammonolysis is carried out in a closed container, the heat evolved from the reaction medium will effect a corresponding rise in the temperature unless, of course, other means are provided for dissipating such reaction heat. The pressure employed, however, is not particularly critical but should be sufficient to maintain the reactants as well as the reaction medium substantially in the liquid phase.

When employing an aqueous reaction medium, the water should be present in amounts sufficient to effect solution of all ingredients if possible although other solvents can be employed to effect solution. Other solvent media which promote a homogeneous reaction system can also be included. It is also advisable to maintain the reactants in a continuous state of motion for example, by suitable agitating means such as a rotary stirrer, so as to insure thorough and intimate intermixing of the involved ingredients throughout the course of the reaction.

As indicated previously, the diamine product is obtained in the form of its dihydrohalide salt. The diamine product can be readily liberated therefrom by merely dissolving the contents of the reaction vessel in water, after first venting off any excess ammonia followed by treatment with excess caustic, e.g., concentrated sodium hydroxide solution.

In order to evaluate the efficiency of the ammonolysis reaction described above, a series of runs were carried out utilizing the following procedure. In each of the runs, the reaction vessel employed was a stainless steel bomb having a volume of 95 cc.

The 1,6-dibromohexane was placed in the stainless steel bomb whereupon liquid ammonia was introduced from another stainless steel bomb. In those runs wherein ammonium chloride was also included, the addition of the liquid ammonia was not made until after achieving thorough admixing of the 1,6-dibromohexane and ammonium chloride. When all ingredients were added, the reaction vessel was agitated mechanically throughout the course of the reaction. In each case, the reaction was substantially complete after approximately 30 minutes, with the major part of the reaction occurring in about 10 minutes. Upon substantial cessation of the ammonolysis reaction any excess ammonia was vented following which the stainless steel bomb was opened and its contents dissolved in water. Any unreacted 1,6-dibromohexane present as a lower organic layer which, in each case, was removed and weighed. The aqueous layer was then treated with an excess of concentrated sodium hydroxide solution whereupon an upper layer of organic material forms. This organic layer was collected and analyzed chromatographically after dissolution in a small amount of methanol.

The conversion and selectivity data are obtained according to the following equations:

Percent conversion=
$$\frac{\text{(moles of 1,6-dibromo-} \quad \text{(moles of 1,6-dibromo-} }{\text{moles of 1,6-dibromohexane input}} \times 100$$
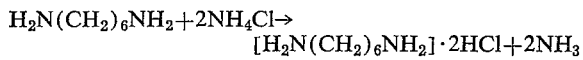

Percent selectivity=
$$\frac{\text{moles of hexamethylenediamine produced}}{\text{(moles of 1,6-dibromo-} \quad \text{(moles of 1,6-dibromo-}} \times 100$$
hexane input) hexane recovered)

The results obtained are tabulated in graphical form in the accompanying drawing wherein the abscissa represents the plot of the mole ratio of ammonia to 1,6-dibromohexane and the ordinate represents the plot of the selectivity (mole percent) of hexamethylenediamine. As will be noted from an inspection of the graph, the use of increased amounts of ammonia promotes the selectivity of hexamethylenediamine. Moreover, when an acidic material in the ammonia system e.g., ammonium chloride, is included in the reaction media, the selectivity of hexamethylenediamine is increased by as much as 10 to 12%. Accordingly, the amine-forming step of the present invention is preferably carried out utilizing ammonia in such amounts as to yield an ammonia/1,6-dibromohexane mole ratio within the range of about 60:1 to about 140:1, and further, in the presence of the ammonia system such as ammonium chloride. As will be noted from the graph, the use of ammonia/1,6-dibromohexane mole ratios on the order of 120:1 in the presence of ammonium chloride results in hexamethylenediamine selectivities on the order of 80% and higher.

Although the present invention has been specifically set forth in connection with the preparation of hexamethylenediamine, it will be understood that the process described herein is generally applicable to the preparation of alkylene diamines from a starting allylic compound of the type defined hereinbefore. For example, the present invention is likewise eminently suitable for the preparation of mixtures of alkylene diamines which, of course, could be readily achieved by merely employing two or more different allylic halides as the starting reactants.

Each of the unit reactions employed in the process of the present invention may be carried out in continuous manner. For example, if it is desired to dispense with the use of autoclaves equipped with mechanical stirring means, the invention may be implemented to advantage in continuous manner by utilizing a plurality of tubular type reactors; the latter may comprise reaction tubes of the requisite size connected in series through which the mixture comprising the reactants may be caused to flow under the desired conditions of temperature, pressure and residence time. Throughout the length of the tubes, orifice plates or baffles may be provided at such intervals as to keep the reaction mixture in a substantially constant state of turbulent flow. However, the foregoing procedure is given for purposes of illustration only and it should be understood that any number of expedients may be employed in advantage in order to achieve continuous processing. Such procedures are well established in the art and need not be discussed in detail here.

In accordance with the present invention, it is preferred to carry out the amine-forming step utilizing ammonia in the liquid phase under super-atmospheric pressure. Since ammonia is normally a gas, it may be liquefied and reacted in the liquid state by maintaining a sufficiently high pressure in the system. This may be readily accomplished by maintaining in the reaction zone an atmospheric pressure at least equal to the combined vapor pressures of the constituents of the reaction mixture at the operating temperature employed. It is in many cases preferable that the ammonolysis reaction be effected under such conditions as to permit the existence of substantially only a liquid phase in the reaction zone. When it is desired to operate in this manner, the reactants may be forced into the reaction zone by means of hydrostatic pressure until any gas phase therein is converted substantially to the liquid phase. However, it will be understood that the ammonolysis reaction utilizing anhydrous liquid ammonia may be carried out using only moderately elevated pressures thereby avoiding any necessity for the use of expensive high pressure equipment.

This invention has been described with respect to certain preferred embodiments thereof, and there will become obvious to persons skilled in the art other variations, modifications and equivalents which are to be understood as coming within the scope of the present invention.

What is claimed is:

1. A process for the preparation of alpha, omega-alkylenediamines which comprises the sequential steps of (1) pyrolyzing an allylic halide having the formula:

$$R—CR_1=CR_2—CH_2—X$$

wherein R, $R_1$ and $R_2$ represent a member selected from the group consisting of hydrogen, alkyl, aryl, alkaryl and aralkyl and X represents a chlorine, bromine or iodine atom, in the presence of an olefin containing 3 to 5 carbon atoms at a temperature of about 400° to 750° C. for a time sufficient to effect substantial condensation and form the corresponding biallylic derivative, (2) hydrohalogenating said biallylic derivative by catalytic reaction with hydrogen bromide at a temperature of about −80° to 35° C. to obtain the corresponding alpha, omega-dihaloalkane and (3) subjecting said alpha, omega-dihaloalkane to ammonolysis by reaction with a molar excess of amonia of about 10:1 to 180:1 at a temperature of about 16° to 100° C. to obtain the alpha, omega-alkylenediamine.

2. A process according to claim 1 wherein said olefin is present in an amount sufficient to yield an olefin/allylic halide mole ratio ranging from about 4:1 to about 1:1.

3. A process according to claim 2 wherein said olefin is propylene.

4. A process according to claim 1 wherein said pyrolysis is effected for a period ranging from about 0.1 to about 50 seconds.

5. A process according to claim 1 wherein said pyrolysis is effected at a temperautre within the range of about 450° to 650° C.

6. A process according to claim 1 wherein said hydrohalogenation is carried out in the presence of a peroxide or hydroperoxide catalyst selected from the group consisting of (1) organic and inorganic peroxides and hydroperoxides and (2) substances which yield peroxides and hydroperoxides under the conditions employed in the hydrohalogenation reaction.

7. A process according to claim 6 wherein said hydrohalogenation is effected at a temperature ranging from −80° to 35° C. at atmospheric pressure.

8. A process according to claim 6 wherein the hydrogen bromide is employed in amounts sufficient to yield a hydrogen bromide-biallylic compound molar ratio within the range of 1.3:1 to about 4:1.

9. A process according to claim 1 wherein said ammonolysis step is effected by contacting said alpha, omega-dihaloalkane with ammonia in the presence of sufficient ammonium halide to yield an ammonium halide/alpha, omega-dihaloalkane molar ratio of up to about 20:1.

10. A process according to claim 9 wherein said ammonia is introduced in anhydrous form.

11. A process for the preparation of hexamethylenediamine which comprises the sequential steps of (1) heating allyl chloride at a temperature within the range of from 450° to about 650° C. in the presence of propylene for a period of time ranging from about 0.1 to about 50 seconds whereby said allyl chloride is converted to 1,5-hexadiene; (2) treating said 1,5-hexadiene with hydrogen bromide in the presence of a free radical supplying catalyst at a temperature within the range of from about −80° to about 35° C. whereby said 1,5-hexadiene is converted to 1,6-dibromohexane and (3) treating said 1,6-dibromohexane with anhydrous ammonia in the presence of an ammonium halide at a temperature ranging from about 16° C. to about 100° C. and recovering the hexamethylenediamine.

12. A process according to claim 11 wherein the propylene is present in step (1) in an amount sufficient to yield a propylene/allyl chloride mole ratio within the range of about 1:1 to about 12:1 inclusive.

13. A process according to claim 11 wherein said catalyst in step (2) is selected from the group consisting of molecular oxygen and air.

14. A process according to claim 11 wherein reaction of the hydrogen bromide with the 1,5-hexadiene mixture in step (2) is effected at a temperature of about −78° to about 26° C.

15. A process according to claim 11 wherein said anhydrous ammonia is present in amounts sufficient to yield an ammonia/1,6-dibromohexane mole ratio within the range of about 10:1 to about 140:1 inclusive.

References Cited

UNITED STATES PATENTS 2,550,020    4/1951    Oxley et al. _____ 260—585
3,052,735    9/1962    Hodgson et al. ____ 260—680 X

OTHER REFERENCES

Groggins, Unit Processes in Organic Synthesis, McGraw-Hill, New York (1947), p. 228.

CHARLES B. PARKER, *Primary Examiner.*

R. L. RAYMOND, *Assistant Examiner.*

U.S. Cl. X.R.

260—570.5, 663, 680